UNITED STATES PATENT OFFICE.

WILTON C. DONN, OF WASHINGTON, DISTRICT OF COLUMBIA, ADMINISTRATOR OF HENRIK GAHN, DECEASED, ASSIGNOR TO CHARLES G. AM ENDE, OF HOBOKEN, NEW JERSEY.

IMPROVEMENT IN COMPOSITIONS FOR PRESERVING FOOD.

Specification forming part of Letters Patent No. 161,944, dated April 13, 1875; application filed October 14, 1874.

CASE C.

*To all whom it may concern:*

Be it known that HENRIK GAHN, deceased, late of Upsala, in the Kingdom of Sweden, invented a new and Improved Composition for Preserving Raw and other Food, of which the following is a specification:

This invention relates to a new composition by which all kinds of raw food, fruit, and other vegetable products may be preserved for a longer time, and in warm climate; and the invention consists in compounding boracic acid and alum in the proportion of about twenty parts of boracic acid and ten parts of alum.

This composition may be used in a powdered state, and then rubbed and sprinkled over layers of the substance to be preserved, or in a liquid state, and then the substances to be preserved have to be dipped or immersed into the liquid. For this solution I prefer to use from eight to ten ounces of the powder to one gallon of water, or as much as the water will dissolve. Sugar in the proportion of about two parts to ten parts of alum and twenty of boracic acid may be also used to advantage, in addition to the ingredients named, and the proportion of the alum may be varied according to the amount of substances to be preserved, some kinds requiring but one part of alum to twenty of boracic acid, and some as much as ten parts of alum to twenty of boracic acid.

I do not claim the composition of boracic acid, gum-tragacanth, salt, chloric acid, alum, and sugar claimed in the patent to H. Gahn, dated January 25, 1870, and numbered 99,180, for this invention is a simplification and improvement on such composition; but I do claim as the invention of HENRIK GAHN—

The composition of boracic acid and alum, as and for the purpose described.

In testimony that I claim the foregoing as the invention of HENRIK GAHN, I affix my signature in presence of two witnesses.

WILTON C. DONN, *Administrator.*

Witnesses:
   J. McKENNEY,
   A. MOORE.